United States Patent
Mawer et al.

(10) Patent No.: US 9,926,840 B2
(45) Date of Patent: Mar. 27, 2018

(54) ROTATABLE DIVERTER VALVE

(71) Applicant: BorgWarner Inc., Auburn Hills, MI (US)

(72) Inventors: James Mawer, Harrogate (GB); Kiumars Shoghi, Huddersfield (GB); Steve Birnie, Halifax (GB); Sean Rylance, Barnsley (GB)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/548,573

(22) PCT Filed: Feb. 3, 2015

(86) PCT No.: PCT/US2015/014183
§ 371 (c)(1),
(2) Date: Aug. 3, 2017

(87) PCT Pub. No.: WO2016/126237
PCT Pub. Date: Aug. 11, 2016

(65) Prior Publication Data
US 2018/0023460 A1    Jan. 25, 2018

(51) Int. Cl.
*F16K 11/085* (2006.01)
*F02B 37/18* (2006.01)
(Continued)

(52) U.S. Cl.
CPC .......... *F02B 37/183* (2013.01); *F02B 37/22* (2013.01); *F02D 9/04* (2013.01); *F02D 9/16* (2013.01);
(Continued)

(58) Field of Classification Search
USPC .................................................. 137/625.47
See application file for complete search history.

(56) References Cited

U.S. PATENT DOCUMENTS

| 1,384,645 A * | 7/1921 | Sullivan .............. F16K 11/0836 137/625.23 |
| 5,943,864 A | 8/1999 | Sumser et al. |

(Continued)

FOREIGN PATENT DOCUMENTS

| DE | 102006058102 A1 | 6/2008 |
| JP | 2007154684 A | 6/2007 |

(Continued)

OTHER PUBLICATIONS

PCT International Search Report and Written Opinion dated Oct. 8, 2015, International Application No. PCT/US2015/014183 filed Feb. 3, 2015, Applicant Borgwarner INC., 7 pages.

(Continued)

*Primary Examiner* — John Fox
(74) *Attorney, Agent, or Firm* — BrooksGroup

(57) ABSTRACT

A turbine (32) section of a turbocharger (30) includes a turbine wheel (37) disposed in a turbine housing (33), the turbine housing (33) defining a gas inlet (34), a volute configured to direct gas from the inlet (34) to the turbine (32) wheel, and a gas outlet. A rotary diverter valve (100, 200) is disposed in the gas inlet (34) upstream of the volute, and provides three modes of controlling exhaust gas flow about the turbocharger (30).

15 Claims, 6 Drawing Sheets

(51) Int. Cl.
    *F02B 37/22*     (2006.01)
    *F02D 9/04*     (2006.01)
    *F02D 9/16*     (2006.01)
    *F16K 3/26*     (2006.01)
    *F02M 26/10*     (2016.01)
    *F16K 11/076*     (2006.01)
    *F02M 26/05*     (2016.01)

(52) U.S. Cl.
    CPC ............ *F02M 26/05* (2016.02); *F02M 26/10* (2016.02); *F16K 3/262* (2013.01); *F16K 11/076* (2013.01); *F16K 11/085* (2013.01)

(56) References Cited

U.S. PATENT DOCUMENTS

| | | | |
|---|---|---|---|
| 7,168,250 B2 * | 1/2007 | Wei | F02B 37/013 123/568.12 |
| 7,428,813 B2 * | 9/2008 | Finger | F02B 37/025 137/625.47 |
| 7,562,529 B2 | 7/2009 | Kuespert et al. | |
| 7,637,106 B2 * | 12/2009 | Hertweck | F02B 37/025 137/625.47 |
| 2007/0056283 A1 | 3/2007 | Klingel | |
| 2009/0211246 A1 | 8/2009 | McEwan et al. | |
| 2011/0123315 A1 | 5/2011 | Robinson | |
| 2012/0328411 A1 | 12/2012 | Robinson et al. | |
| 2016/0298533 A1 | 10/2016 | Mawer | |

FOREIGN PATENT DOCUMENTS

| | | |
|---|---|---|
| KR | 1020110014553 A | 2/2011 |
| WO | 2014078109 A1 | 5/2014 |

OTHER PUBLICATIONS

Korean Office Action dated Nov. 6, 2017; Application No. 10-2017-7022126; 8 pages.

* cited by examiner

ROTATABLE DIVERTER VALVE

BACKGROUND

Turbochargers are provided on an engine to deliver air to the engine intake at a greater density than would be possible in a normal aspirated configuration. This allows more fuel to be combusted, thus boosting the engine's horsepower without significantly increasing engine weight.

Generally, turbochargers use the exhaust flow from the engine exhaust manifold, which enters the turbine stage of the turbocharger at a turbine housing inlet, to thereby drive a turbine wheel, which is located in the turbine housing. The turbine wheel is affixed to one end of a shaft that is rotatably supported within a bearing housing. The shaft drives a compressor impeller mounted on the other end of the shaft. As such, the turbine wheel provides rotational power to drive the compressor impeller and thereby drive the compressor stage of the turbocharger. Air is compressed within the compressor stage, and is then provided to the engine intake as described above.

SUMMARY

In some aspects, a cylindrical rotary valve is configured to control fluid flow through a fluid passage. The valve includes a first end, a second end that is opposed to the first end, and a side surface that extends between the first end and the second end. The valve includes a first inlet opening formed in the side surface, a first outlet opening formed in the side surface, and a first valve passage that connects the first inlet opening to the first outlet opening. In addition, the valve includes a second inlet opening formed in the side surface, a second outlet opening formed in the side surface, and a second valve passage that connects the second inlet opening to the second outlet opening. The second valve passage is separate from the first valve passage, the first inlet opening, the first outlet opening, and the second inlet opening are each disposed between the first end and a mid portion of the valve, and the second outlet opening is disposed between the mid portion and the second end.

The valve may include one or more of the following features: The first inlet opening and the first outlet opening are on opposed sides of the valve. The first inlet opening is generally axially aligned with, and circumferentially spaced apart from, the second inlet opening. The second inlet opening is circumferentially spaced apart from the second outlet opening. The valve includes a third inlet opening formed in the side surface, a third outlet opening formed in the side surface, and a third passage that connects the third inlet opening to the third outlet opening, wherein the third inlet opening and the third outlet opening are disposed between the first end and the mid portion of the valve. At least one of the first inlet opening and the second inlet opening is generally rectangular in shape.

In some aspects, a turbocharger includes a turbine section including a turbine housing and turbine wheel disposed in the turbine housing, the turbine housing defining a gas inlet, a volute configured to direct gas from the inlet to the turbine wheel, and a gas outlet. The turbocharge also includes a rotary valve disposed in the gas inlet in such a manner that a rotational axis of the valve extends transverse to a direction of gas flow through the inlet. The valve includes a first end, a second end that is opposed to the first end, a side surface that extends between the first end and the second end, and a longitudinal axis that extends through the first and second ends and coincides with the rotational axis of the valve. The valve includes a first inlet opening formed in the side surface, a first outlet opening formed in the side surface, and a first valve passage that connects the first inlet opening to the first outlet opening. The valve also includes a second inlet opening formed in the side surface, a second outlet opening formed in the side surface, and a second passage that connects the second inlet opening to the second outlet opening. The second passage is separate from the first passage, and the first inlet opening, the first outlet opening, and the second inlet opening are each positioned so as to communicate with the gas inlet for certain rotational orientations of the valve, and the second outlet opening is positioned so as to be able to communicate with the gas outlet for certain rotational orientations of the valve.

The turbocharger may include one or more of the following features: The valve is configured to provide three modes of operation of the turbocharger, including a fully open mode that corresponds to a first rotational orientation of the valve, in which all the exhaust gas flows through the valve to the turbine wheel, a wastegated mode that corresponds to a second rotational orientation of the valve, in which a portion of the exhaust gas is redirected around the turbine wheel to the exhaust outlet, and a backpressured mode that corresponds to a third rotational orientation of the valve, in which the exhaust inlet is at least partially obstructed. When the valve is in the first rotational orientation, the first inlet opening is aligned with the gas inlet and faces toward an upstream direction relative to a direction of gas flow, the first outlet opening is aligned with the gas inlet and faces toward a downstream direction relative to a direction of gas flow, and the second inlet opening is obstructed. When the valve is in the second rotational orientation, the second inlet opening is aligned with the gas inlet and faces toward an upstream direction relative to a direction of gas flow, the second outlet opening is aligned with the gas outlet, and the first inlet opening is at least partially obstructed. The turbocharger further includes an actuator that is connected to the valve first end and configured to control a rotational position of the valve about the longitudinal axis. The first inlet opening and the first outlet opening are on opposed sides of the valve. The first inlet opening is generally axially aligned with, and circumferentially spaced apart from, the second inlet opening. The second inlet opening is circumferentially and axially spaced apart from the second outlet opening. The valve comprises a third inlet opening formed in the side surface, a third outlet opening formed in the side surface, a third passage that connects the third inlet opening to the third outlet opening, wherein the third inlet opening and the third outlet opening are disposed between the first end and the mid portion of the valve.

There are certain engine operating conditions in which it is desirable to divert a portion of the exhaust gases away from the turbine wheel in order to regulate the turbine speed, which in turn regulates the rotating speed of the compressor. In other operating conditions, it is desirable to take some of the high pressure exhaust gas flow from the engine before it reaches the turbine wheel, and redirect it to the engine air intake along with pressurized air from the compressor section of the turbocharger. For example, Exhaust Gas Recirculation (EGR) can reduce NOx emissions (e.g., NO (nitric oxide) and $NO_2$ (nitrogen dioxide)) of the engine. In addition, in still other operating conditions, it is desirable to increase pressure across the engine cylinders to induce engine braking. In order to achieve turbine inlet pressure control, EGR and/or engine braking, an exhaust gas turbocharger includes a diverter valve disposed in the exhaust gas inlet of the turbine. The diverter valve is configured to permit multiple modes of turbocharger operation, where the mode is determined by the rotational orientation of the valve within the exhaust gas inlet. In the illustrated embodiment, the diverter valve provides three modes of operation.

The first mode corresponds to a first rotational orientation of the diverter valve in which the exhaust gas inlet is fully open, whereby all exhaust gas discharged from the engine is directed into the exhaust gas inlet of the turbocharger turbine and toward the turbine wheel.

The second mode corresponds to a second rotational orientation of the diverter valve in which the exhaust gas inlet is at least partially closed, and at least a portion of the exhaust gas discharged from the engine bypasses the turbine wheel is directed into the exhaust gas outlet of the turbocharger turbine. In this mode, the diverter valve operates as a turbocharger wastegate valve.

The third mode corresponds to a third rotational orientation of the diverter valve in which the exhaust gas inlet is at least partially closed and little or no exhaust gas is passed through the valve. In this mode, back pressure is generated in the exhaust line. When the diverter valve is partially closed, there is sufficient increase in back pressure to drive engine exhaust gas recirculation (EGR). When the diverter valve is more fully closed or completely closed, there is sufficient back pressure in the engine cylinders to achieve engine braking.

Thus, the rotational orientation of the diverter valve within the exhaust gas inlet determines an operating mode of the turbocharger. Within each mode, incremental changes in the rotational orientation of the diverter valve can be used to accurately control the amount of exhaust flow between a fully open position, a fully closed position, and any opening amount intermediate the fully open and fully closed positions. In addition, for a given rotational orientation of the valve, by changing the size and shape of the diverter valve openings, the rate of flow through the openings can be changed, permitting optimization of exhaust gas flow characteristics.

BRIEF DESCRIPTION OF THE DRAWINGS

Embodiments are illustrated by way of example and not limitation in the accompanying drawings in which like reference numbers indicate similar parts.

DETAILED DESCRIPTION

Figure 1:
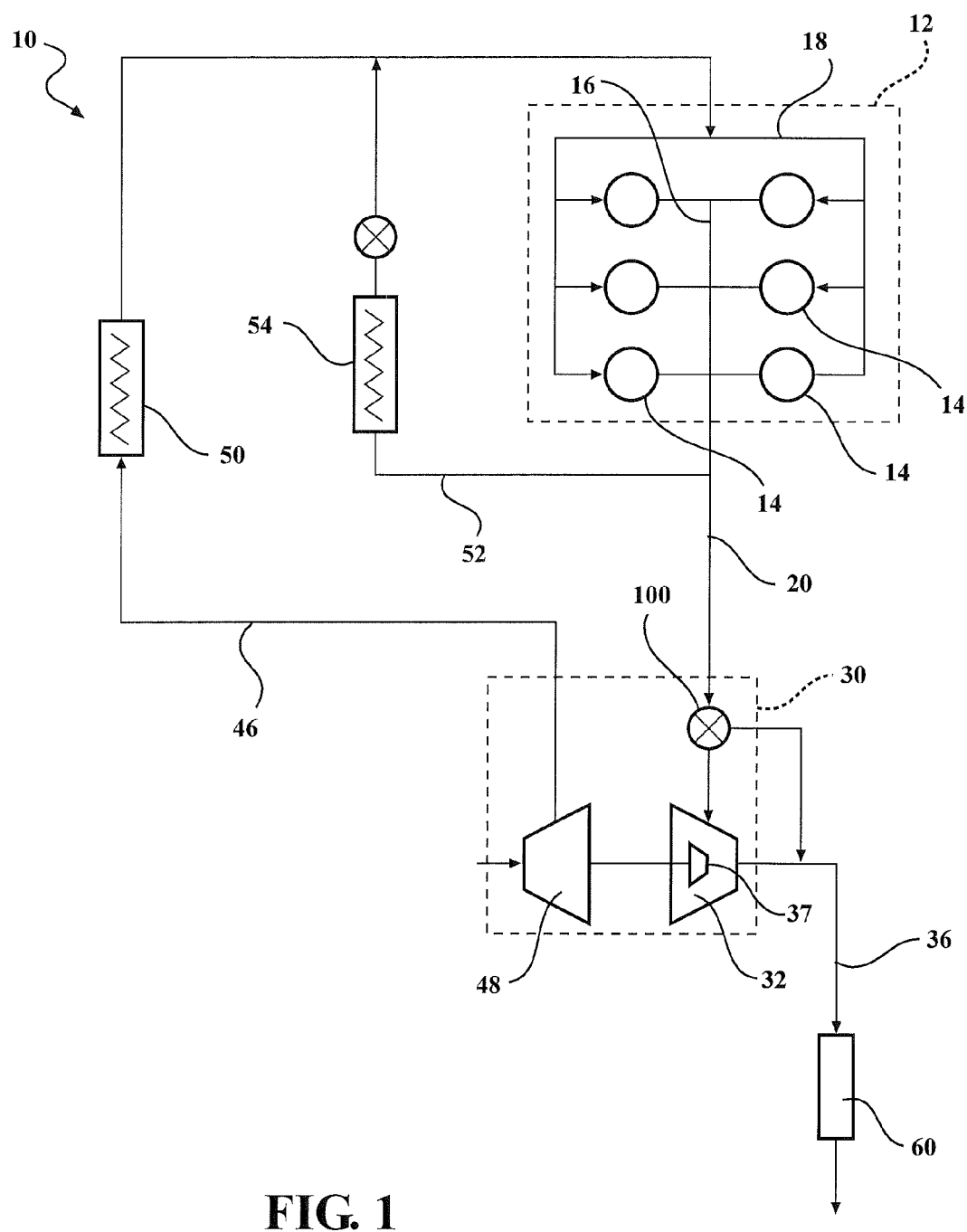
FIG. 1 is a schematic view of an engine system for an engine that is connected to a turbocharger.

Referring to FIG. 1, an engine system 10 for a turbocharged internal combustion engine 12 includes a rotary diverter valve 100 that adjustably controls the pressure of exhaust gas in the exhaust passage 20 downstream of the engine 12, whereby exhaust gas flow and pressure within the passage 20 can be accurately controlled. The engine 12 is arranged so that one or more of the engine cylinders 14 are connected to an exhaust manifold 16. Downstream of the engine 12, the exhaust manifold 16 directs the exhaust gas to the exhaust passage 20 that supplies high temperature, high pressure exhaust gas to an exhaust gas turbine 32 of a turbocharger 30. After being expanded within the turbine 32, the reduced-pressure exhaust gas is directed via an exhaust gas outlet passage 36 to one or more aftertreatment devices 60 such as catalytic converters, particulate traps, and $NO_x$ traps prior to being released to the atmosphere.

On the air delivery side of the engine 12, charged air is generated within the compressor section 48 of the turbocharger 30, and supplied to the engine cylinders 14 via an air delivery line 46 connected to an air intake manifold 18 of the engine 12. An intercooler device 50 is disposed in the air delivery line 46 to cool the charged air prior to delivery to the cylinders 14. Exhaust gas recirculation is accomplished via an EGR passage 52 that connects the exhaust passage 20 to the air delivery line 46. An EGR cooler 54 is provided in the EGR passage 52 to cool the recirculated portion of the exhaust gas prior to delivery to the air delivery line 46. In the system 10, the diverter valve 100 is disposed in an exhaust gas inlet of the turbine 32 to control exhaust gas flow and pressures within the turbine and in the exhaust passage 20, as discussed in detail below.

Figure 2:
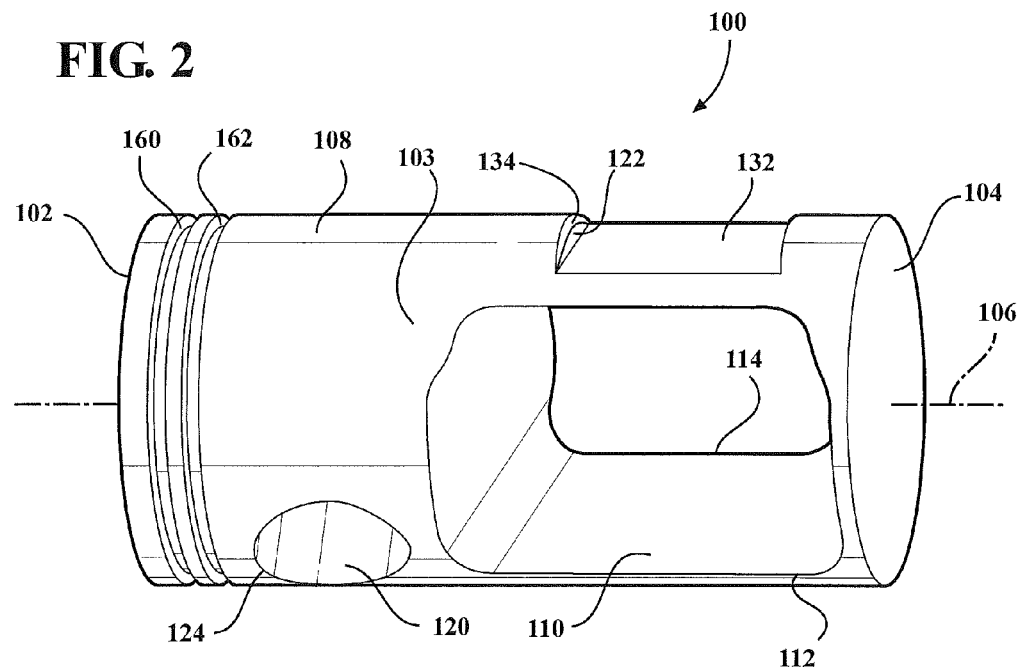
FIG. 2 is a perspective view of a rotary diverter valve isolated from an inlet of the turbocharger.
Figure 3:
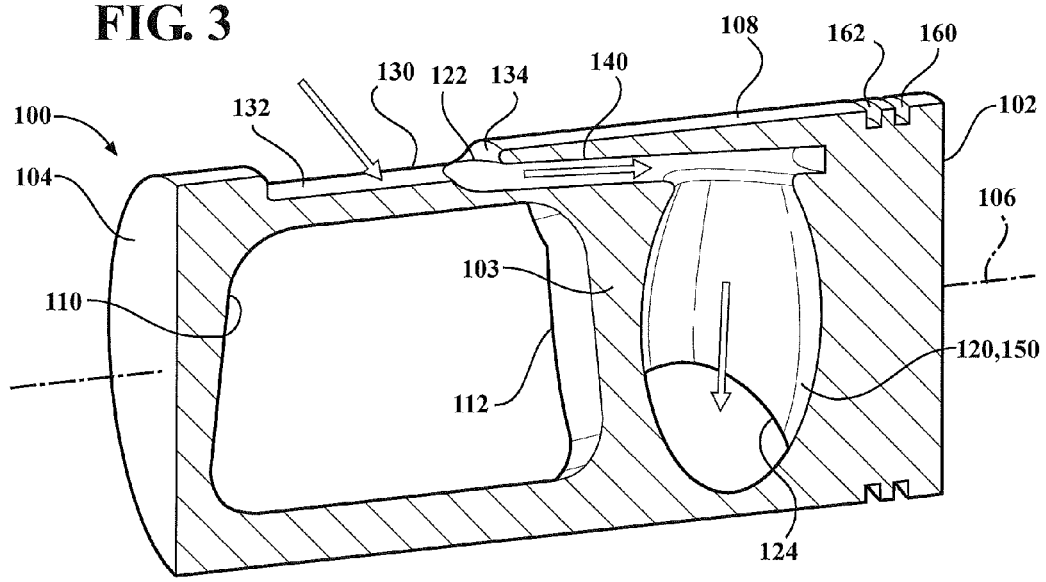
FIG. 3 is a cross-sectional view of the rotary diverter valve of FIG. 2.

Referring to FIGS. 2 and 3, the diverter valve 100 is cylindrical, and includes a first end 102, and a second end 104 that is opposed to the first end 102. The diverter valve 100 includes a longitudinal axis 106 that coincides with a rotational axis of the diverter valve 100 and extends through both the first end 102 and the second end 104. The first and second ends 102, 104 each define a plane transverse to the longitudinal axis 106. The diverter valve 100 includes a side surface 108 that extends between the first end 102 and the second end 104. The diverter valve is supported within an inlet 34 of the exhaust gas turbine 32 of the turbocharger 30 in such a way that the longitudinal axis 106 extends transverse to the direction of gas flow. In addition, the diverter valve 100 is dimensioned such that, for some rotational orientations of the diverter valve 100, the exhausts gas inlet 34 is completely obstructed and no exhaust gas flows through the exhaust gas inlet 34.

The diverter valve 100 includes internal passages 110, 120 therethrough that, for some rotational orientations of the diverter valve 100, permit gas flow through the diverter valve 100. In the illustrated embodiment, the diverter valve 100 includes a first, or main, valve passage 110, and a second, or bypass, valve passage 120 that is separate from, and has no communication with, the main valve passage 110.

The main valve passage 110 extends between a first inlet opening 112 and a first outlet opening 114 that are formed in the side surface 108. The main valve passage 110 follows a generally linear path and extends in a direction transverse to the longitudinal axis 106, whereby the first inlet opening 112 and the first outlet opening 114 are on opposed sides of the diverter valve 100. The main valve passage 110 is generally rectangular in shape, and is axially positioned between the valve second end 104 and a mid portion 103 of the diverter valve 100.

The bypass valve passage 120 extends between a second inlet opening 122 and a second outlet opening 124 that are formed in the side surface 108. The bypass valve passage 120 follows a circuitous path through the diverter valve 100, whereby the second inlet opening 122 and the second outlet opening 124 are axially and circumferentially spaced apart. In the illustrated embodiment, the second inlet opening 122 and the second outlet opening 124 have a spacing of about 120 degrees along a circumference of the diverter valve 100. In addition, the second inlet opening 122 is axially positioned between the valve second end 104 and the mid portion 103. That is, the second inlet opening 122 is generally axially aligned with, and circumferentially spaced apart from, the first inlet opening 112. In the illustrated embodiment, the second inlet opening 122 and the first inlet opening 112 have a spacing of about 90 degrees along a circumference of the diverter valve 100.

The second outlet opening 124 is axially positioned between the mid portion 103 and the valve first end 102, whereby the second inlet opening 122 is disposed on an axially-opposed side of the mid portion 103 relative to the second outlet opening 124. Since the second inlet opening 122 and the second outlet opening 124 are circumferentially spaced apart, the bypass valve passage 120 is indirect. In particular, the bypass valve passage 120 includes a first portion 130 that corresponds to a recessed, planar land 132 formed in the side surface 108. The second inlet opening 122 is formed in an axially-facing shoulder 134 defined between the land 132 and the circular side surface 108. The bypass valve passage 120 includes a second portion 140 that communicates with the first portion 130, and extends axially within an interior of the diverter valve 100. In the illustrated embodiment, the second portion 140 is slightly angled relative to the longitudinal axis 106, whereby the second portion 140 is closest to the longitudinal axis 106 adjacent to the first end 102. The bypass valve passage 120 includes a third portion 150 that connects the second portion 140 to the second outlet opening 124. The third portion 150 extends in a direction transverse to the longitudinal axis 106, and has a shape that corresponds to the shape of the second outlet opening 124. In the illustrated embodiment, the shape of second outlet opening 124 and the third portion 150 is generally circular.

The size of the cross sectional area of the main valve passage 110 and the bypass valve passage 120 is determined by the requirements of the specific application. In the illustrated embodiment, the main valve passage 110 has a large cross sectional area relative to that of the bypass valve passage 120. Thus, in this exemplary embodiment, the diverter valve 100 is suitable for applications in which the amount of exhaust gas to be directed through the bypass valve passage 120 is small relative to the amount of exhaust gas to be directed through the main valve passage 110. It is understood, however, that the passage sizes are not limited to the sizes or proportions shown.

The shape of the main valve passage 110 and the bypass valve passage 120 is also determined by the requirements of the specific application. In the illustrated embodiment, the main valve passage 110 has a generally rectangular shape, whereas the shape of the bypass valve passage 120 varies along the length of the bypass valve passage 120. The shape of the valve passages 110, 120 and/or the shape of the first and second inlet openings 112, 122 can be changed, and is selected based on the desired gas flow characteristics, and optimization of the characteristics. Possible shapes include, but are not limited to, circular, rectangular, tear-drop shaped, and triangular.

The diverter valve 100 can be made from the same or similar materials as those used to form the turbine housing so that issues related to thermal expansion in use can be avoided. However, the material used to form the diverter valve 100 is not limited to this, and it is understood that the diverter valve 100 may be formed of any other material(s) suitable for use in the high-temperature, high pressure and caustic environment of the engine exhaust passage 20 and turbine exhaust gas inlet 34, such as ceramic materials. Moreover, the material may be cast, forged, sintered, coated, etc., based on the requirements of the specific application.

The diverter valve side surface 108 includes two circumferentially-extending grooves 162, 164 that are rectangularly shaped and dimensioned to receive piston rings 87, 88 (FIGS. 4 and 6) which form a seal between the side surface 108 and the portion of the turbine housing corresponding to the exhaust gas inlet 34. The grooves 160, 162 are closely axially spaced, and are disposed between the valve first end 102 and the second outlet opening 124.

Figure 4:
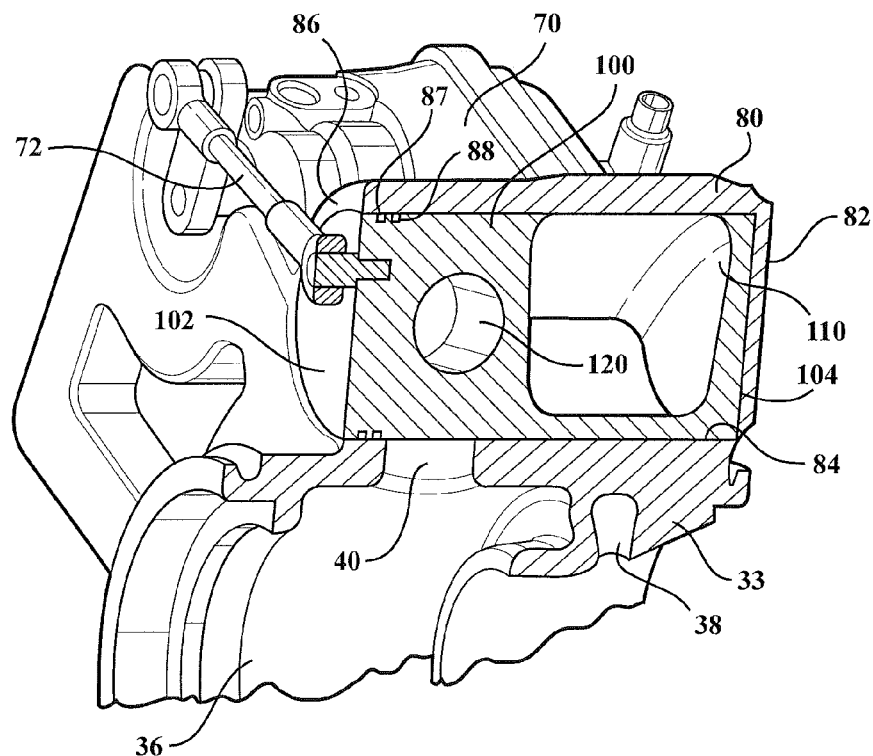
FIG. 4 is a cross-sectional view of the turbocharger illustrating the rotary diverter valve disposed in the turbine inlet and showing the rotary diverter valve in a fully open position.
Figure 5:
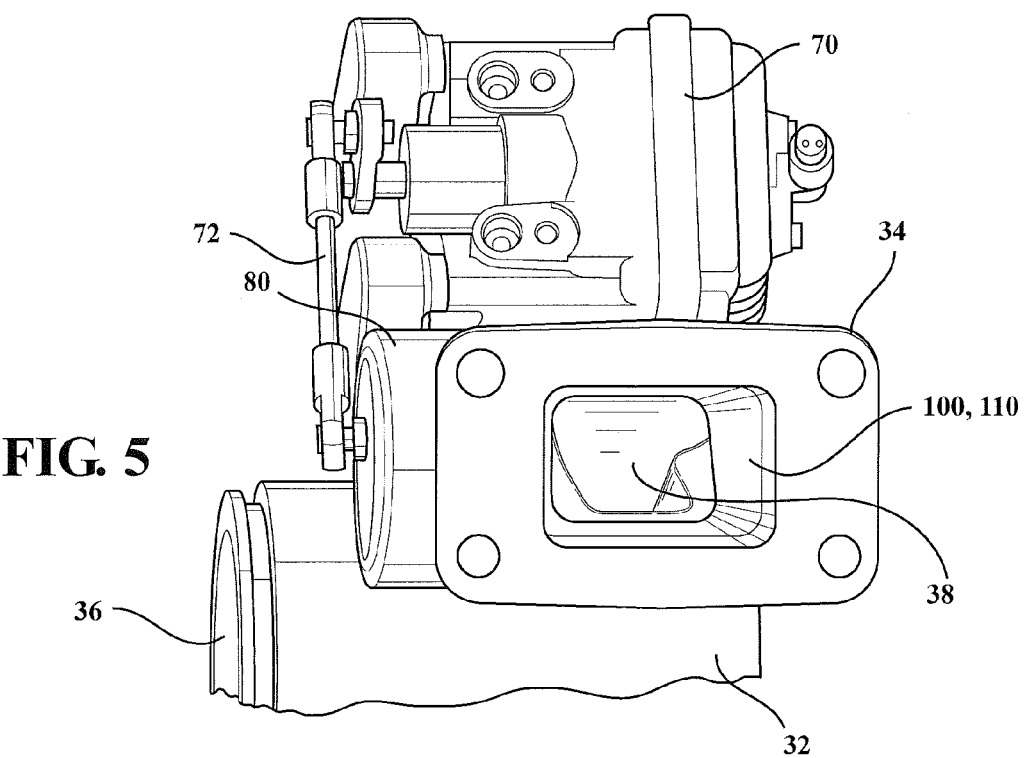
FIG. 5 is an inlet end view of the turbocharger showing the rotary diverter valve in a fully open position.
Figure 6:
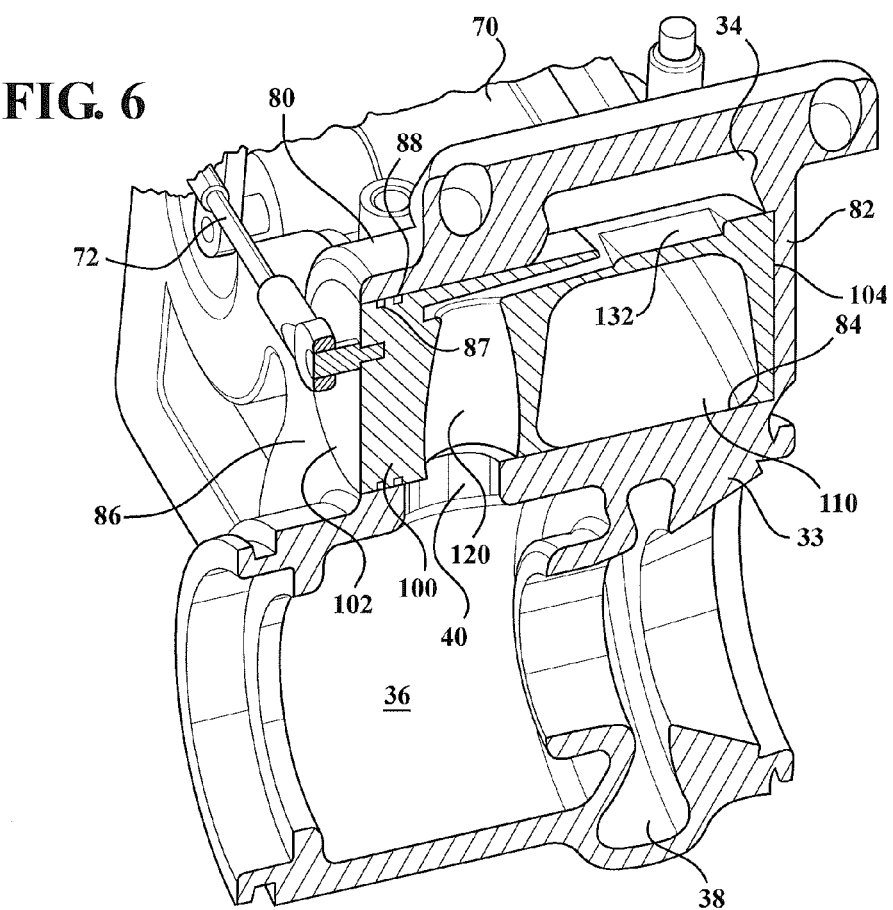
FIG. 6 is a cross-sectional view of the turbocharger illustrating the rotary diverter valve disposed in the turbine inlet and showing the rotary diverter valve in a fully closed, wastegating position.

Referring to FIGS. 4-6, the diverter valve 100 is disposed in the exhaust gas inlet 34 of the turbine 32 at a location immediately upstream of the turbine volute 38 with respect to the direction of gas flow within the turbine 32. In order to accommodate the diverter valve 100, the turbine housing 33 includes a hollow, generally cylindrical valve housing 80 that intersects with the exhaust gas inlet 34. The valve housing 80 supports the diverter valve 100 for rotation about its longitudinal axis 106 in such a way that the diverter valve 100 is disposed in the flow path of exhaust gas passing through the exhaust gas inlet 34, and such that the valve longitudinal axis 106 is generally parallel to a rotational axis of the turbocharger rotating assembly (not shown), which includes the turbine wheel 37, compressor impeller, and interconnecting shaft.

The valve housing 80 has a closed end 82, and the diverter valve 100 is disposed in the valve housing 80 such that the valve second end 104 faces the closed end 82 with minimal clearance. Moreover, the valve housing 80 is dimensioned so that a cylindrical inner surface 84 of the valve housing 80 surrounds the valve side surface 108 with minimal clearance.

The valve housing 80 has an open end 86, and the valve first end 102 resides in the valve housing open end 86. By this arrangement, the valve first end 102 is exposed to the atmosphere. As previously discussed, piston rings 87, 88 provided on the valve side surface 108 adjacent the first end 102 provide a seal so that exhaust gas is prevented from escaping via the valve housing open end 86. Advantageously, by exposing the valve first end 102, the valve first end 102 can be connected to an actuator 70 via an actuator rod 72. The actuator 70 is used to control the rotational orientation of the diverter valve 100 within the valve housing 80 and relative to the turbine exhaust gas inlet 34.

The diverter valve 100 as described herein is configured to permit multiple modes of turbocharger operation, where the operation mode is determined by the rotational orientation of the diverter valve 100 within the turbine exhaust gas inlet 34 as controlled by the actuator 70. In particular, the diverter valve 100 is configured to provide the following three modes of turbocharger operation: fully-open operation; wastegated operation; and backpressured operation.

The first, or fully-open operation, mode corresponds to a first rotational orientation of the diverter valve 100 in which the exhaust gas inlet 34 is fully open (FIGS. 4 and 5). In this mode, the diverter valve 100 is oriented so that the first inlet opening 112 is disposed in the exhaust gas inlet 34 so as to open facing upstream (e.g. toward the engine 12), the first outlet opening 114 is disposed in the exhaust gas inlet 34 so as to open facing downstream (e.g., away from engine 12 and toward the turbine volute 38), and the first internal passage 110 defines a portion of the exhaust gas inlet 34 which is generally continuous with adjacent portions of the exhaust gas inlet 34. By this configuration, all exhaust gas discharged from the engine 12 is smoothly directed into the exhaust gas inlet 34 of the turbocharger turbine and toward the turbine wheel 37. In the fully-open operation mode, the second inlet opening 122 and the second outlet opening 124 face the valve housing inner surface 84, whereby no gas flows through the second internal passage 120.

Figure 7:
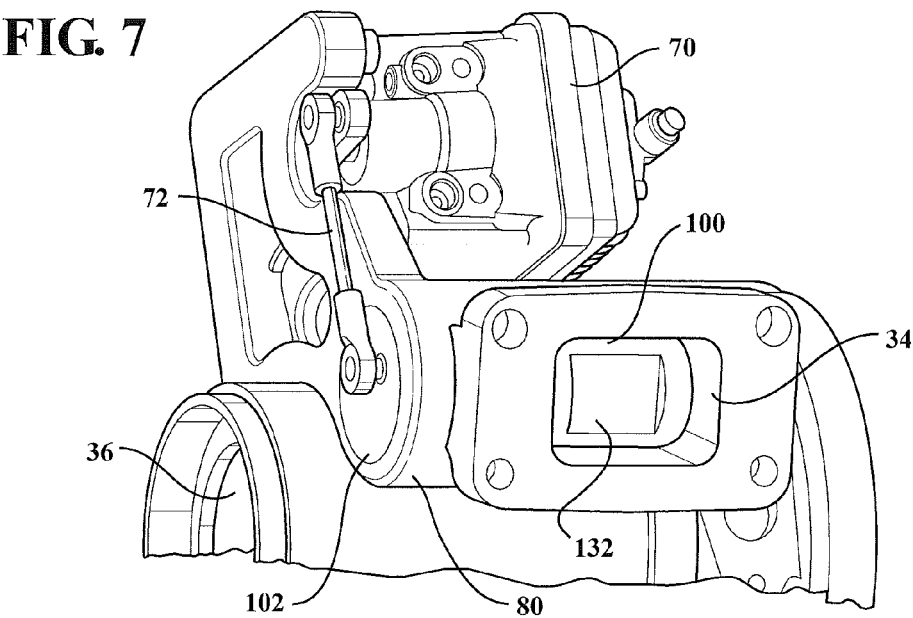
FIG. 7 is an inlet end view of the turbocharger showing the rotary diverter valve in a fully closed, wastegating position.

The second, or wastegated operation, mode corresponds to a second rotational orientation of the diverter valve 100 in which the exhaust gas inlet is at least partially closed, and at least a portion of the exhaust gas discharged from the engine 12 is directed into the exhaust gas outlet 36 of the turbocharger turbine 32 and bypasses the turbine wheel 37. In this mode, the diverter valve 100 is oriented so that the second inlet opening 122 is disposed in the exhaust gas inlet 34 so as to open facing upstream (e.g. toward the engine 12), and the second outlet opening 124 is aligned with a bypass port 40. The bypass port 40 is formed in a portion of the turbine housing wall common to the valve housing 80 and the exhaust gas outlet 36. Thus, the second outlet opening 124 communicates with the exhaust gas outlet 36 via the bypass port 40, and directs exhaust gas downstream (e.g., away from engine 12 and toward the aftertreatment devices 60). By this configuration, the second internal passage 120 defines a turbine bypass passage (FIGS. 6 and 7), and the diverter valve 100 operates as a turbocharger wastegate valve.

In the wastegated operating mode, the diverter valve 100 can be oriented so that the first inlet opening 112 and the first outlet opening 114 face the valve housing inner surface 84, whereby no gas flows through the first internal passage 110 (FIGS. 6 and 7), or can be oriented so that a only a portion of the first inlet and outlet openings 112, 114 communicate with the exhaust gas inlet 34, whereby some gas flow to the turbine wheel 37 is permitted (not shown). The amount of gas flow to the turbine wheel 37 is controlled by controlling the rotational orientation of the diverter valve 100, and thus also controlling the amount of exposure of the first inlet and outlet openings 112, 114 to the exhaust gas inlet 34.

The third, or backpressured operation, mode corresponds to a third rotational orientation of the diverter valve 100 in which the exhaust gas inlet 34 is at least partially closed, and a reduced amount of exhaust gas is passed through the diverter valve 100. In this mode, the diverter valve 100 is oriented so that the first inlet opening 112 is, at most, partially disposed in the exhaust gas inlet 34 so as to open facing acing upstream (e.g. toward the engine 12), the first outlet opening 114 is, at most, partially disposed in the exhaust gas inlet 34 so as to open facing downstream (e.g., away from the engine 12 and toward the turbine volute 38), and the first internal passage 110 defines a portion of the exhaust gas inlet 34. In one backpressured operation mode, the diverter valve 100 is partially closed. As a result, there is sufficient increase in back pressure to achieve one type of engine exhaust gas recirculation (EGR) in which back pressure is generated in the exhaust passages 20, 52 and exhaust gas flow is directed to the engine cylinders 14 via the air intake manifold 18.

Figure 8:
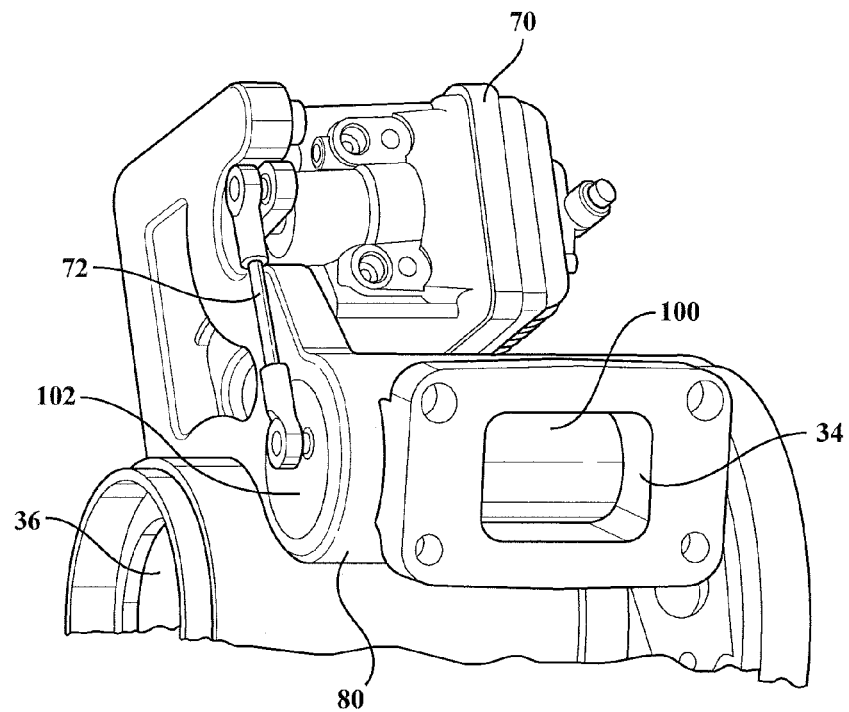
FIG. 8 is an inlet end view of the turbocharger showing the rotary diverter valve in a fully closed position corresponding to engine braking.

In another backpressured operation mode, the diverter valve 100 is partially closed or completely closed (FIG. 8). In this case, there is sufficient back pressure in the engine cylinders 14 to achieve another type of EGR that directs exhaust flow directly back to engine exhaust manifold 16 and provides engine braking.

In the backpressured operation modes, the second inlet opening 122 and the second outlet opening 124 face the valve housing inner surface 84, whereby no gas flows through the second internal passage 120.

Thus, the rotational orientation of the diverter valve 100 within the exhaust gas inlet 34 is controlled to determine an operating mode of the turbocharger 30. Within each mode, incremental changes in the rotational orientation of the diverter valve 100 can be used to accurately control the amount of exhaust flow between fully open, fully closed, and any opening amount intermediate fully open and fully closed. In addition, for a given rotational orientation of the diverter valve 100, by changing the size and shape of the diverter valve openings 112, 114, 122, 124, 132, the rate of flow through the openings can be changed, permitting optimization of exhaust gas flow characteristics.

Figure 9:
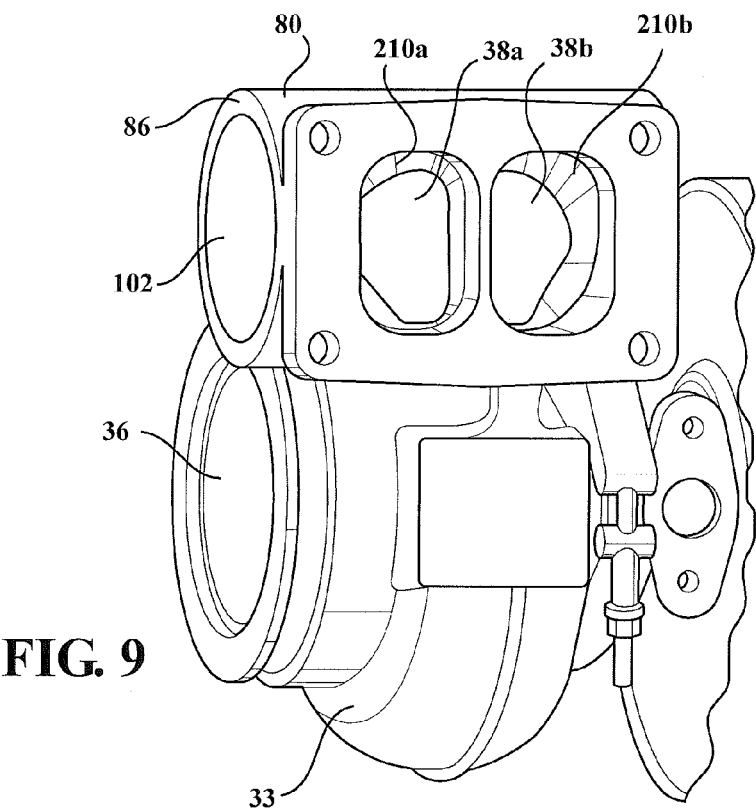
FIG. 9 is an inlet end view of the turbocharger showing an alternative rotary diverter valve in a fully open position.
Figure 11:
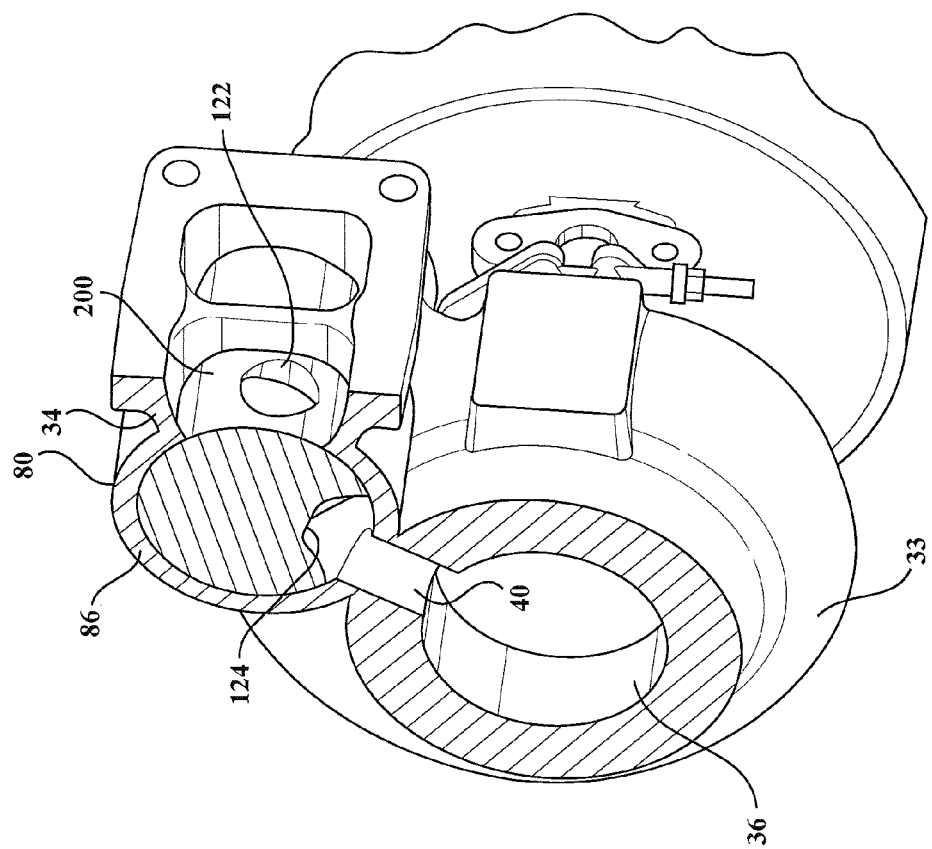
FIG. 11 is an inlet end view of the turbocharger showing the alternative rotary diverter valve in a wastegating position.
Figure 10:
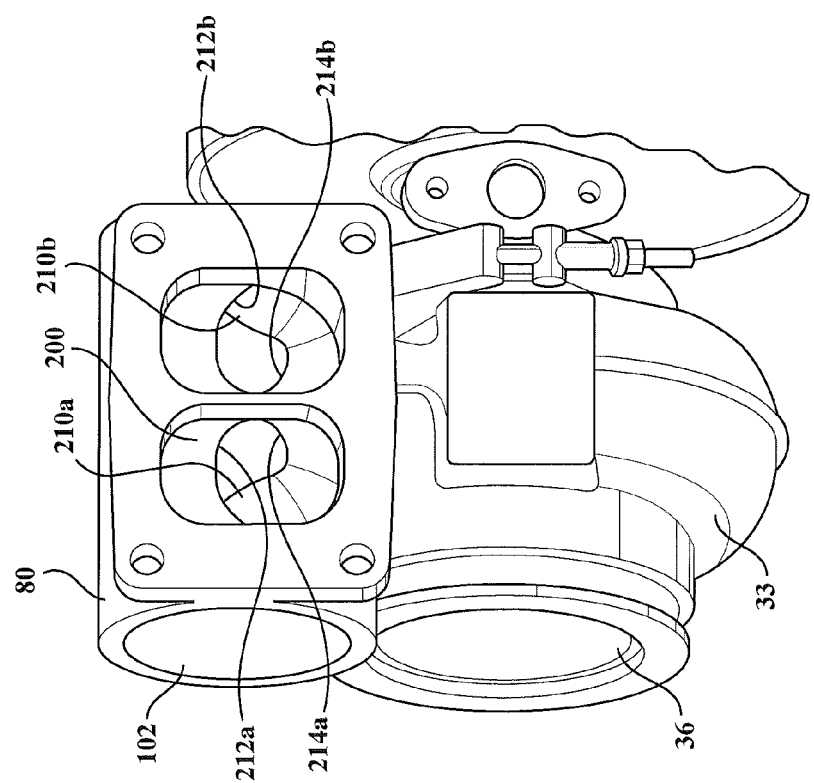
FIG. 10 is an inlet end view of the turbocharger showing the alternative rotary diverter valve of FIG. 9 in a partially open position.

Referring to FIGS. 9-11, an alternative rotary diverter valve 200 is configured for use in a turbocharger turbine 32' having a twin volute design. The diverter valve 200 illustrated in FIGS. 9-11 is substantially similar to the diverter valve 100 described above, and common elements are referred to with common reference numbers. As in the previous embodiment, the amount of gas flow to the turbine wheel 37 is controlled by controlling the rotational orientation of the diverter valve 200.

However, in order to accommodate the twin volute design, and to permit control of flow to each volute individually, the single, large main passage 110 of the diverter valve 100 is replaced with two, relatively smaller through passages 210a and 210b, each having a corresponding inlet opening 212a, 212b and outlet opening 214a, 214b. The first through passage 210a is separate from, and has no communication with, the second through passage 210b. In certain rotational orientations of the diverter valve 200, the first through passage 210a communicates with a first volute 38a, and the second through passage 210b communicates with a second volute 38b.

During fully-open operation of the turbocharger 30, the diverter valve 200 is rotationally oriented within the valve housing 80 relative to the exhaust gas inlet 34 so that the first through passage 210a is aligned with the first volute 38a, and the second through passage 210b is aligned with the second volute 38b whereby the exhaust gas inlet 34 is fully open and there is full exhaust gas flow into both volutes 38a, 38b (FIG. 9). In this mode, the second inlet opening 122 and the second outlet opening 124 face the valve housing inner surface 84, whereby no gas flows through the second internal passage 120.

During backpressured operation of the turbocharger 30, the diverter valve 200 is rotationally oriented within the valve housing 80 relative to the exhaust gas inlet 34 so that the first through passage 210a is partially aligned with the first volute 38a, and the second through passage 210 is partially aligned with the second volute 38b whereby there is reduced exhaust gas flow into both volutes 38a, 38b (FIG.

10). In this mode, the second inlet opening 122 and the second outlet opening 124 face the valve housing inner surface 84, whereby no gas flows through the bypass passage 120.

During wastegated operation of the turbocharger 30, the diverter valve 200 is rotationally oriented in such a way that the second volute 38b is fully closed, and first volute 38a is bypassed. In this mode, the diverter valve 200 is oriented so that the second inlet opening 122 is disposed in the portion of the exhaust gas inlet 34 corresponding to the first volute 38a so as to open facing upstream toward the engine 12, the second outlet opening 124 is aligned with the bypass port 40 of the exhaust gas outlet 36 so as to open facing downstream toward the aftertreatment devices 60, and the second internal passage 120 defines a turbine bypass passage (FIG. 11). In this mode, the respective inlet openings 212a, 212b and outlet openings 214a, 214b of the through passages 210a, 210b face the valve housing inner surface 84, whereby no gas flows through the through passages 210a, 210b. By this configuration, the diverter valve 200 operates as a turbocharger wastegate valve. In particular, the second volute 38b is fully closed, and the bypass passage 120 is used to bypass the first volute 38a. In this mode, no exhaust gas will enter the turbine wheel 37, and back pressure is created that can be used for either EGR or engine braking.

Although the diverter valve 200 is described herein as a single cylindrical element that controls exhaust gas flow to each individual volute, the diverter valve 200 is not limited to this configuration. For example, in some embodiments, the diverter valve 200 may be formed as two or more cylindrical elements that are coaxial, serially arranged along the longitudinal axis 106 within the valve housing 80, and configured to be individually controlled. As a result, the exhaust gas pressure can be selectively increased or decreased within each volute independently of the other volute.

In the illustrated embodiment, the diverter valve 100, 200 is connected to the actuator 70 via a linkage assembly that includes the actuator rod 72. However, the connection between the diverter valve 100 and the actuator 70 is not limited to this arrangement. For example, in other embodiments, a rotational actuator or electronic actuator can be directly connected to the diverter valve 100, eliminating a need for a linkage assembly.

Aspects described herein can be embodied in other forms and combinations without departing from the spirit or essential attributes thereof. It is understood that embodiments are not limited to the specific details described herein, which are given by way of example only, and that various modifications and alterations are possible within the scope of the following claims.

What is claimed is:

1. A cylindrical rotary valve configured to control fluid flow through a fluid passage, the valve comprising
    a first end,
    a second end that is opposed to the first end,
    a side surface that extends between the first end and the second end,
    a first inlet opening formed in the side surface,
    a first outlet opening formed in the side surface,
    a first valve passage that connects the first inlet opening to the first outlet opening,
    a second inlet opening formed in the side surface,
    a second outlet opening formed in the side surface, and
    a second valve passage that connects the second inlet opening to the second outlet opening,
    wherein
    the second valve passage is separate from the first valve passage,
    the first inlet opening, the first outlet opening, and the second inlet opening are each disposed between the first end and a mid portion of the valve, and
    the second outlet opening is disposed between the mid portion and the second end.

2. The valve of claim 1 wherein the first inlet opening and the first outlet opening are on opposed sides of the valve.

3. The valve of claim 1, wherein the first inlet opening is generally axially aligned with, and circumferentially spaced apart from, the second inlet opening.

4. The valve of claim 1 wherein the second inlet opening is circumferentially spaced apart from the second outlet opening.

5. The valve of claim 1 wherein the valve comprises
    a third inlet opening formed in the side surface,
    a third outlet opening formed in the side surface, and
    a third passage that connects the third inlet opening to the third outlet opening,
    wherein the third inlet opening and the third outlet opening are disposed between the first end and the mid portion of the valve.

6. The valve of claim 1 wherein at least one of the first inlet opening and the second inlet opening is generally rectangular in shape.

7. A turbocharger comprising
    a turbine section including a turbine housing and turbine wheel disposed in the turbine housing, the turbine housing defining a gas inlet, a volute configured to direct gas from the inlet to the turbine wheel, and a gas outlet; and
    a rotary valve disposed in the gas inlet in such a manner that a rotational axis of the valve extends transverse to a direction of gas flow through the inlet, the valve comprising:
    a first end,
    a second end that is opposed to the first end,
    a side surface that extends between the first end and the second end,
    a longitudinal axis that extends through the first and second ends and coincides with the rotational axis of the valve,
    a first inlet opening formed in the side surface,
    a first outlet opening formed in the side surface,
    a first valve passage that connects the first inlet opening to the first outlet opening,
    a second inlet opening formed in the side surface,
    a second outlet opening formed in the side surface, and
    a second passage that connects the second inlet opening to the second outlet opening,
    wherein
    the second passage is separate from the first passage, and
    the first inlet opening, the first outlet opening, and the second inlet opening are each positioned so as to communicate with the gas inlet for certain rotational orientations of the valve, and the second outlet opening is positioned so as to be able to communicate with the gas outlet for certain rotational orientations of the valve.

8. The turbocharger of claim 7, wherein the valve is configured to provide three modes of operation of the turbocharger, including
    a fully open mode that corresponds to a first rotational orientation of the valve, in which all the exhaust gas flows through the valve to the turbine wheel, a wastegated mode that corresponds to a second rotational orientation of the valve, in which a portion of the exhaust gas is redirected around the turbine wheel to the exhaust outlet, and a backpressured mode that corresponds to a third rotational orientation of the valve, in which the exhaust inlet is at least partially obstructed.

9. The turbocharger of claim 8, wherein when the valve is in the first rotational orientation, the first inlet opening is aligned with the gas inlet and faces toward an upstream direction relative to a direction of gas flow, the first outlet opening is aligned with the gas inlet and faces toward a downstream direction relative to a direction of gas flow, and the second inlet opening is obstructed.

10. The turbocharger of claim 8, wherein when the valve is in the second rotational orientation, the second inlet opening is aligned with the gas inlet and faces toward an upstream direction relative to a direction of gas flow, the second outlet opening is aligned with the gas outlet, and the first inlet opening is at least partially obstructed.

11. The turbocharger of claim 7, further comprising an actuator that is connected to the valve first end and configured to control a rotational position of the valve about the longitudinal axis.

12. The turbocharger of claim 7 wherein the first inlet opening and the first outlet opening are on opposed sides of the valve.

13. The turbocharger of claim 7, wherein the first inlet opening is generally axially aligned with, and circumferentially spaced apart from, the second inlet opening.

14. The turbocharger of claim 7 wherein the second inlet opening is circumferentially and axially spaced apart from the second outlet opening.

15. The turbocharger of claim 7 wherein the valve comprises
a third inlet opening formed in the side surface,
a third outlet opening formed in the side surface,
a third passage that connects the third inlet opening to the third outlet opening,
wherein the third inlet opening and the third outlet opening are disposed between the first end and the mid portion of the valve.

* * * * *